April 4, 1950        C. HALEY ET AL        2,502,719
COLLET STOP
Filed Sept. 21, 1946
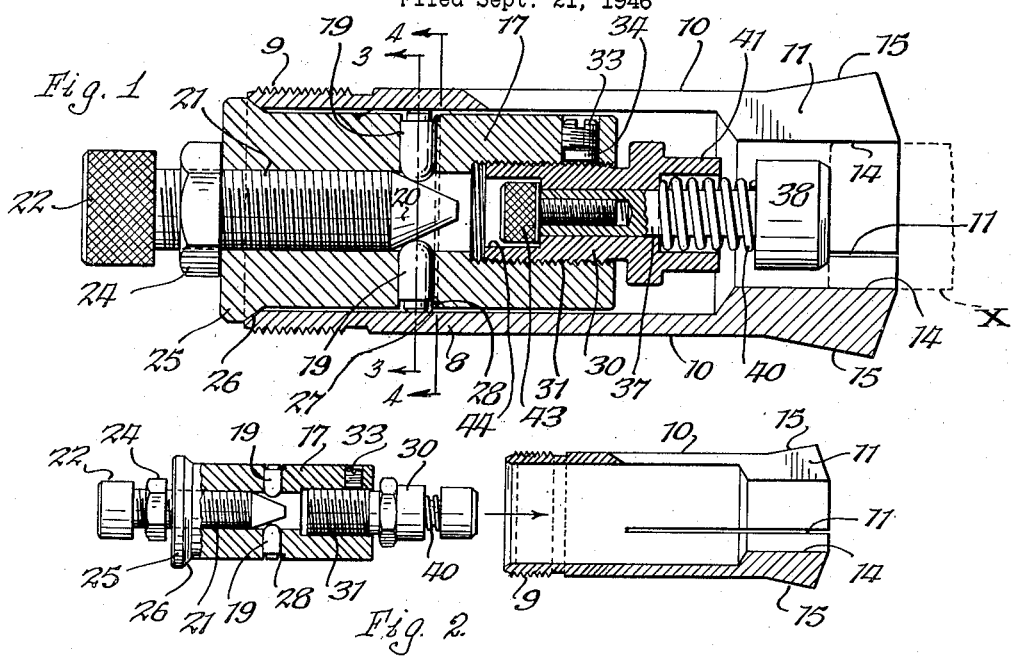
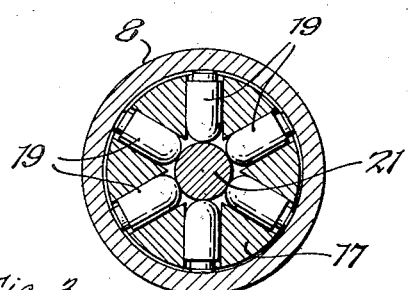
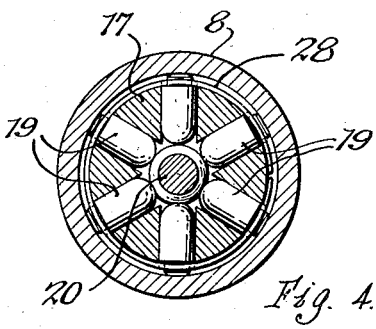
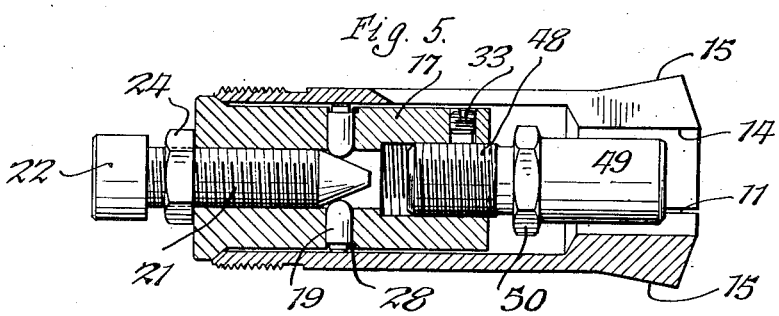
INVENTORS
Clifford Haley & Henry A. Lundy
by Parker, Trochmor & Farmer,
ATTORNEYS Patented Apr. 4, 1950

2,502,719

UNITED STATES PATENT OFFICE 2,502,719

COLLET STOP

Clifford Haley, Flushing, and Henry A. Lundy, Elmira, N. Y., assignors to Hardinge Brothers, Inc., Elmira, N. Y.

Application September 21, 1946, Serial No. 698,502

3 Claims. (Cl. 279—46)

This invention relates to improvements in work stops for use in connection with collets of the types which are commonly employed in connection with lathes and similar machines.

One of the objects of this invention is to provide a work stop, which may be used in connection with collets of different types without requiring any changes in the collets themselves. Another object of this invention is to provide a work stop which may be readily applied to and removed from a collet. A further object is to provide a work stop of this type which is readily adjustable to enable the work to be inserted into the collet to the desired extent. It is also an object of this invention to provide a collet work stop with means of improved construction for readily and rigidly securing a body portion of the work stop in a collet. A further object is to provide a work stop of this type including a body portion which may be securely applied to a collet, and an insert member which is adjustably secured to the body portion to vary the extent to which work may be inserted into the collet.

Another object of this invention is to provide a collet work stop with means for ejecting the work from the collet when the work is released by the collet.

Other objects and advantages of this invention will appear from the following description and claims.

In the accompanying drawings, which illustrate by way of example one embodiment of this invention:

Fig. 1 is a longitudinal central sectional view of a collet having a work stop embodying this invention applied thereto.

Fig. 2 is a similar view on a smaller scale showing the improved work stop removed from the collet and in position to be applied to the same.

Figs. 3 and 4 are transverse sectional elevations thereof, on lines 3—3 and 4—4 respectively, of Fig. 1.

Fig. 5 is a longitudinal central sectional elevation of a collet work stop of modified construction.

The accompanying drawings show a collet of a type commonly used in connection with lathes and similar machines, which includes a cylindrical portion 8 which may be provided with the usual exteriorly threaded part 9 by means of which the collet may be secured to the usual collet draw tube arranged within the spindle of a lathe or other machine. The collet is provided with a series of spring fingers 10 which may be formed by providing slits 11 extending lengthwise from the work gripping end of the collet to the cylindrical portion 8, to form the spring fingers. The work gripping ends of the spring fingers have the usual work gripping inner faces 14 and outer slightly inclined or beveled faces 15 which are formed to engage correspondingly beveled or inclined faces of the lathe spindle (not shown) so that when the collet shown in Fig. 1 is drawn to the left relatively to the spindle, the spring fingers will be moved inwardly toward the longitudinal axis of the collet into gripping engagement with the work. When the collet is moved in the opposite direction from its work clamping position, the spring fingers, by their own resilience, move outwardly and out of clamping engagement with the work to release the same. A collet or any other construction may be employed in connection with our improved work stop.

The collet work stop shown includes a body portion 17 which is formed to be inserted into the interior of the collet and gripped or locked in fixed position in the collet. This body portion is of generally circular cross section, and has a central axial bore or hole extending from end to end of said body portion. Any suitable or desired means may be employed for locking the body portion to the unslitted part 8 of the collet so as not to interfere with the resilient action of the spring fingers. In the particular construction shown, the body portion of the collet stop is provided with a plurality of radially extending holes in which locking pins 19 are slidably arranged in such a manner that these pins may be pressed outwardly into gripping engagement with the inner surface of the part 8 of the collet. These fingers may be moved outwardly into their gripping positions by any suitable means, such for example as a tapering or conical part 20 which is movable lengthwise in a central hole or aperture in the body portion. In the particular construction illustrated, by way of example, this tapering part 20 is formed on the end of a screw 21 which has a threaded engagement in a threaded portion of the axial hole in the body portion 17. This screw has a head 22 by means of which the screw may be turned in one direction to urge the locking pins 19 outwardly into engagement with the cylindrical part of the collet or in another direction to release the locking pins to permit the collet stop to be removed from the collet. If desired, a lock nut 24 may be provided on the screw 21 for securely holding the locking screw in locking position.

In order to facilitate the centering of the body portion 17 of the collet stop in the collet, the body portion 17 may be provided at the outer end thereof with an enlargement or flange 25 of larger diameter than the internal diameter of the cylindrical portion of the collet. This flange has a tapering or frusto-conical face 26 which is formed to engage the end of the cylindrical portion 8 of the collet to center the body portion of the stop with reference to the cylindrical part 8 of a collet. The body portion will be further centered by means of the locking pins 19 so that the axis of the body portion will substantially co-incide with the axis of the collet. By means of this construction it is possible to make the body portion of an outside diameter considerably smaller than the inside diameter of most makes of collets, so that the collet work stop may be made to fit collets of a number of different makes.

Any suitable means may be employed to hold the locking pins within their radial holes, and for this purpose, the radial holes terminate in an annular groove or recess 27 in the body 17 and the outer ends of the locking pins are of reduced diameters, thus forming shoulders on the outer parts of the locking pins. A split spring ring 28 is provided within the groove 27 and is so positioned as to engage the outer shouldered portions of the locking pins and normally urge them inwardly toward the longitudinal axis of the body portion 17. Consequently, when the collet work stop is removed from a collet as shown in Fig. 2, the locking pins will be held on the body 17. When it is desired to remove the locking pins, the spring ring 28 can readily be removed from the recess 27.

The inner end of the body portion may serve as a stop to engage work inserted into the collet and thus to limit the extent to which work may be inserted. In many cases it is, however, desirable to provide adjustable means for varying the extent to which work may be inserted, and for this purpose we preferably provide a stop insert member 30 which has a threaded part 31 formed to cooperate with a correspondingly threaded part in the central hole or aperture of the body portion 17. The stop insert member 30 is, consequently, adjustable lengthwise of the stop body 17 by turning these parts relatively to each other on their screw threads, and suitable locking means are preferably provided to hold the stop insert in its adjusted relation to the stop body. For this purpose, a threaded hole may be provided extending radially of the stop body in which a screw plug 33 may be provided which bears against a soft metal plug 34. When the screw plug 33 is tightened, it urges the soft metal plug 34 against the threads of the stop insert 30 and holds the insert against turning relatively to the stop body 17. The outer end of the stop insert may be used as a stop against the work inserted into the collet which may abut, and thus limit the extent to which the work may be inserted, or if desired, a work ejector may also be applied to the stop insert 30 as in the construction shown in Figs. 1 and 2. When a work ejector is desired, the stop insert 30 is provided at the central guide aperture within which a stem or shank 37 of a work ejector may slide lengthwise of the collet, the work ejector shown including a head 38 on the stem 37 with which the work X may engage. The work ejector is normally urged outwardly by means of an ejector spring 40, and the stop insert 30 is preferably provided with an annular flange or extension 41 into which the ejector spring 40 may extend. This flange is of larger internal diameter than the guide aperture of the stem 37, thus forming an internal shoulder on the stop insert 30 against which one end of the ejector spring 40 may bear, the other end of the spring bearing against the head 38 of the ejector.

Means of any suitable type may be employed for limiting the work ejection movement of the ejector by the spring 40, and in the construction shown for this purpose, a retaining screw is provided having a head 43 arranged within an enlarged hole 44 within the stop insert member 30, the screw having a threaded stem which engages a central threaded aperture in the stem 37 of the ejector. Consequently, the head 43 of the retaining screw limits the extent to which the head or plunger 38 of the ejector may be moved outwardly by the spring 40.

In the use of the collet stop described, the stop insert 30 is first adjusted relatively to the body portion 17 while the stop is removed from the collet by first loosening the screw plug 33 and then turning the insert for adjusting the same according to the extent to which the work is to be inserted into the collet, whereupon the screw plug 33 is again tightened. The collet work stop is then ready to be inserted into the collet as shown in Fig. 2, the locking screw 21 having been withdrawn so that the locking pins will be urged inwardly by means of the split spring ring 28. The stop is then inserted into the collet to the maximum extent so that the beveled portion 26 of the body 17 engages the end of the collet for centering the adjacent end of the stop in the collet. The screw 22 is then turned to move the locking pins 19 outwardly into locking engagement with the cylindrical part 8 of the collet, whereupon the stop is centered in the collet and is ready for use. The lock nut 24 is then tightened to prevent loosening of the stop in the collet.

In the use of the stop, the work X is pressed against the ejector head 38 until the inner end of the head engages the adjacent end of the flange 41 of the stop insert 30, whereupon the ejector spring 40 will be pressed and arranged entirely within the flange 41 of the stop insert. The collet is then actuated to close the jaws thereof to grip the work, whereupon the necessary operations may be performed on the work. When the operations on the work are completed, the collet is moved to the right relatively to the lathe spindle to permit the jaws to open and release the work, whereupon the ejector head 38, actuated by the spring 40, urges the work outwardly with reference to the collet.

In case the ejector is not required, the collet work stop may be constructed as shown in Fig. 5, in which case the body portion 17 of the stop may be identical with the one shown in Figs. 1 and 2. In this construction, however, the stop insert may be a single piece having one end thereof threaded as shown at 48 and the other end is provided with a head 49, the end of which forms a stop for the work. This stop insert member may also be adjusted relatively to the stop body 17 to adapt the same to vary the extent to which work can be inserted into the collet. The stop inserts shown in all of the figures may be provided with portions 50 of enlarged diameters which may be of hexagonal or other form to facilitate the turning of the insert relatively to the body of the stop.

It will be obvious, of course, that stop inserts of other shapes and sizes may be provided to adapt the device for work of different types. The various stop inserts will all have similar threaded portions to engage the internal threads of the body portion 17. Consequently, a solid stop insert could be substituted for the ejector type shown in Figs. 1 and 2, or an ejector type of stop insert could be used in Fig. 5. The heads 49 and 38 of the stop inserts may vary in length and diameter to suit work of different types, and inserts with such modified heads can readily be secured to the body portion 17 of the stop as described.

The collet work stops shown have the advantage that they can be easily and quickly applied to collets made by different manufacturers. The external diameter of the body portion 17 of the stop may be materially smaller than the internal diameter of the collet, and consequently, by means of the beveled portion 26 and adjustable gripping fingers 19, the collet stop may be applied to collets varying considerably in internal diameter.

We claim:

1. A stop for a collet having a cylindrical portion and work gripping spring fingers, said stop including a body portion formed to extend into said cylindrical portion of said collet and having at least three radially extending holes spaced equally from each other about the axis of said body portion, means for locking said body portion in said cylindrical portion of said collet, including locking pins slidably arranged in said holes in said body portion and movable outwardly from said body portion into gripping engagement with the inner surface of said collet, a part within the body portion formed to engage the inner ends of said locking pins to force said pins outwardly into engagement with the inner surface of the cylindrical portion of said collet, and a stop insert member secured to said body portion and arranged within said collet to limit the extent to which work may be inserted into said collet.

2. A collet stop according to claim 1 and including a screw having a threaded engagement with an axially extending hole in said body portion and having a substantially conical end which engages said pins to move the same outwardly into locking positions.

3. A stop for a collet having a cylindrical portion and work gripping spring fingers, said stop including a body portion formed to extend into said cylindrical portion of said collet, means on said body portion for gripping said cylindrical portion to releasably hold said body portion in said collet, said body portion having a threaded axial hole formed therein, a stop insert member having a threaded engagement with said axial hole of said body portion for adjusting said insert member lengthwise of said body portion, an ejector member slidably mounted on said stop insert member and having a head formed to abut against an end of said stop insert member, a spring acting on said ejector member for urging the same outwardly with reference to said stop insert member for ejecting work when released by said collet, said head when work is inserted into said collet being pushed into position in which it engages said stop insert member and being held in said position when the collet is closed for accurately limiting the extent to which work may be inserted into said collet.

CLIFFORD HALEY.
HENRY A. LUNDY.

REFERENCES CITED

The following references are of record in the file of this patent:

UNITED STATES PATENTS

| Number | Name | Date |
| --- | --- | --- |
| 1,332,817 | Dusha et al. | Mar. 2, 1920 |
| 2,361,085 | Carlson | Oct. 24, 1944 |
| 2,396,504 | Grey | Mar. 12, 1946 |
| 2,398,279 | Bailey | Apr. 9, 1946 |

OTHER REFERENCES

La Rue (American Machinist Magazine of July 6, 1922). (Copy Div. 52.)

Qielinski (American Machinist Magazine of Sept. 28, 1944). (Copy Div. 52.)